(12) United States Patent
Nishii (10) Patent No.: US 10,048,434 B2
(45) Date of Patent: Aug. 14, 2018

(54) BACKLIGHT DEVICE AND LIQUID-CRYSTAL DISPLAY DEVICE

(71) Applicant: SHARP KABUSHIKI KAISHA, Osaka-shi, Osaka (JP)

(72) Inventor: Takeshi Nishii, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 283 days.

(21) Appl. No.: 14/436,299

(22) PCT Filed: Nov. 1, 2013

(86) PCT No.: PCT/JP2013/079752
§ 371 (c)(1),
(2) Date: Apr. 16, 2015

(87) PCT Pub. No.: WO2014/073493
PCT Pub. Date: May 15, 2014

(65) Prior Publication Data
US 2015/0277028 A1  Oct. 1, 2015

(30) Foreign Application Priority Data
Nov. 8, 2012 (JP) ................................. 2012-245949
Nov. 8, 2012 (JP) ................................. 2012-245951

(51) Int. Cl.
*F21V 8/00* (2006.01)
*G02F 1/1335* (2006.01)
(Continued)

(52) U.S. Cl.
CPC ......... *G02B 6/0085* (2013.01); *G02B 6/0073* (2013.01); *G02B 6/0091* (2013.01);
(Continued)

(58) Field of Classification Search
CPC .. G02B 6/0081; G02B 6/0085; G02B 6/0073; G02B 6/0091; G02F 2001/133314;
(Continued)

(56) References Cited

U.S. PATENT DOCUMENTS 8,659,718 B2 * 2/2014 Sekiguchi ......... G02F 1/133308
349/58
9,039,267 B2 * 5/2015 Que .................. G02F 1/133615
362/612
(Continued)

FOREIGN PATENT DOCUMENTS

EP 2582218 A1 * 4/2013 ....... G02F 1/133615
JP 2008-53062 A 3/2008
(Continued)

OTHER PUBLICATIONS

English language translation (machine) of Japanese Unexamined Pub. No. 2011-082176 A to Noh et al.*

*Primary Examiner* — Claude J Brown
(74) *Attorney, Agent, or Firm* — Birch, Strewart, Kolasch & Birch, LLP (57) ABSTRACT

Provided are a backlight device and a liquid-crystal display device whereby, while carrying out a radiation countermeasure of a light source, uniformity of temperature of a back face chassis is effected. The backlight device comprises: a light-guide plate (12) which emits toward the front face side light which enters from an end face; a light source (14*a*) which projects light toward the end face; a back face chassis (9) which is disposed on the back face side of the light-guide plate; and a heat radiation member (8*a*) which is disposed on the back face side of the back face chassis, and which dissipates heat from the light source. The heat radiation member further comprises chassis contact portions (38*a*-
(Continued)

38c) which make partial contact with the back face of the back face chassis at multiple sites.

7 Claims, 7 Drawing Sheets

(51) Int. Cl.
    *F21V 7/04*           (2006.01)
    *G02F 1/1333*       (2006.01)

(52) U.S. Cl.
    CPC ............... *G02F 1/133615* (2013.01); *G02F 2001/133314* (2013.01); *G02F 2001/133628* (2013.01)

(58) Field of Classification Search
    CPC ... G02F 2001/133628; G02F 1/133608; G02F 1/133615; F21V 29/76
    USPC .......................................... 362/612, 615, 617
    See application file for complete search history.

(56) References Cited

U.S. PATENT DOCUMENTS

| | | | |
|---|---|---|---|
| 2007/0019419 A1* | 1/2007 | Hafuka | G02F 1/133603 362/373 |
| 2007/0147075 A1* | 6/2007 | Bang | G02F 1/133605 362/609 |
| 2009/0073346 A1* | 3/2009 | Mikami | G02B 6/0028 349/65 |
| 2009/0231297 A1 | 9/2009 | Hatakeyama | |
| 2009/0321772 A1* | 12/2009 | Shida | F21K 9/00 257/98 |
| 2010/0066937 A1* | 3/2010 | Yamashita | G02B 6/0085 349/58 |
| 2011/0085107 A1 | 4/2011 | Noh et al. | |
| 2011/0176331 A1* | 7/2011 | Yang | G02F 1/133615 362/612 |
| 2011/0199545 A1* | 8/2011 | Kuromizu | G02B 6/0073 348/739 |
| 2011/0205450 A1* | 8/2011 | Mouri | G02B 6/0055 348/739 |
| 2011/0249470 A1* | 10/2011 | Lin | G02B 6/0085 362/612 |
| 2012/0020114 A1* | 1/2012 | Miyamoto | G02B 6/0085 362/612 |
| 2012/0257107 A1* | 10/2012 | Itoh | G02B 6/0085 348/553 |
| 2013/0242540 A1* | 9/2013 | Kuo | G02F 1/133608 362/97.1 |
| 2013/0322117 A1* | 12/2013 | Kuo | G09F 13/18 362/611 |
| 2014/0085564 A1* | 3/2014 | Hendren | G02F 1/133385 349/58 |
| 2014/0185324 A1 | 7/2014 | Noh et al. | |

FOREIGN PATENT DOCUMENTS

| | | |
|---|---|---|
| JP | 2009-217206 A | 9/2009 |
| JP | 2011-253769 A | 9/2009 |
| JP | 2011-82176 A | 4/2011 |

* cited by examiner

CROSS SECTIONAL
VIEW OF SECTION-X

FIG.6

ENLARGED
VIEW OF SECTION-X1

FIG.7

BACKLIGHT DEVICE AND LIQUID-CRYSTAL DISPLAY DEVICE

TECHNICAL FIELD

The present invention relates to a backlight device and a liquid-crystal display device, and specifically relates to a backlight device having a radiation structure for radiating heat from a backlight light source and a liquid-crystal display device.

BACKGROUND OF THE INVENTION

These days, a screen size of a liquid-crystal display device such as a thin type television is becoming larger, and products having a screen size of, for example, a 60-inch type, a 70-inch type and an 80-inch type are sold. In such a liquid-crystal display device, one which uses an LED (Light Emitting Diode) as a backlight light source instead of a conventional fluorescent tube is most commonly used. Moreover, the liquid-crystal display device is used not only for a television but in various applications such as a monitor of a PC (personal computer) and a digital signage (electronic sign), and the LED is also required to have higher luminance (higher output power) accordingly.

In the above liquid-crystal display device, radiation countermeasures of the LED need to be carried out because an amount of heat generation also increases as the LED has higher luminance. For example, Patent Document 1 describes a structure that an LED substrate in which an LED serving as a heat source is arranged is attached to a heat radiation member made of aluminum called heat sink (also referred to as heat spreader) for dissipating heat from the LED. Further, Patent Document 2 describes a structure that a heat radiation member is provided behind a back face chassis (also referred to as backlight chassis) provided on a back face side of a light-guide plate.

PRIOR ART DOCUMENT

Patent Documents

Patent Document 1: Japanese Laid-Open Patent Publication No. 2009-217206
Patent Document 2: Japanese Laid-Open Patent Publication No. 2011-253769

SUMMARY OF THE INVENTION

Problem to be Solved by the Invention

In the meantime, when the heat radiation member is provided behind the back face chassis, it is necessary to make contrivances for not returning heat which is guided to the heat radiation member to a side of the back face chassis, but a relation between the heat radiation member and the back face chassis is not shown in Patent Document 1. On the other hand, Patent Document 2 shows that the back face chassis is connected to the heat radiation member with a guide roller, but has a problem that temperature at this connection position increases locally and high-low temperature variations are easily caused in the back face chassis.

Further, an optical sheet having a thin sheet shape is provided in the liquid-crystal display device, which is susceptible to heat. Thermal deformation of the optical sheet causes deterioration in display quality of the liquid-crystal display device, which is not desirable.

In the meantime, Patent Document 1 does not show fixing of the back face chassis. On the other hand, in Patent Document 2, a position of the back face chassis is not determined unless the guide roller is used, and the heat radiation member needs to be pressed down on the back face chassis. Therefore, there is a problem that a backlight device which forms the liquid-crystal display device is difficult to be manufactured.

The present invention has been made in view of circumstances as described above, and aims to provide a backlight device that seeks uniformity of temperature of aback face chassis while carrying out heat radiation measures of a light source, and a liquid-crystal display device.

Further, the present invention aims to provide the backlight device that seeks to facilitate manufacturing while carrying out heat radiation measures of the light source, and the liquid-crystal display device.

Means for Solving the Problem

To solve the above problems, a first technical means of the present invention is a backlight device, comprising: a light-guide plate that emits incident light from an end face to a front side; a light source that irradiates light toward the end face; a back face chassis that is provided on a side of a back face of the light-guide plate; and a heat radiation member that is provided on a side of a back face of the back face chassis and dissipates heat from the light source, wherein the heat radiation member has chassis contact portions that make partial contact with the back face of the back face chassis at multiple sites.

A second technical means is the backlight device of the first technical means, wherein the chassis contact portions have larger contact areas with the back face chassis when a distance from the light source is long than when the distance from the light source is short.

A third technical means is the backlight device of the first technical means, wherein the heat radiation member has radiation fins on sides of back faces of the chassis contact portions.

A fourth technical means is the backlight device of the first technical means, wherein the heat radiation member is made of aluminum and a surface thereof is subjected to black alumite treatment.

Moreover, to solve the above problems, a fifth technical means is a backlight device, comprising: a light-guide plate that emits incident light from an end face to a front side; a light source that irradiates light toward the end face; a back face chassis that is provided on a side of a back face of the light-guide plate; and a heat radiation member that is provided on a side of a back face of the back face chassis, holds the light source at a site being extended toward the end face, and dissipates heat from the light source, wherein the heat radiation member has a chassis holding portion that determines a position of the back face chassis.

A sixth technical means is the backlight device of the fifth technical means, wherein a bend portion that an end edge of the back face chassis is bent to the side of the back face of the back face chassis is included and an inner side of the bend portion and the chassis holding portion are engaged.

A seventh technical means is the backlight device of the fifth technical means, wherein the back face chassis has a projecting portion on the back face of the back face chassis and is fixed to the heat radiation member by using a fixing member inserted from a side of a back face of the heat radiation member at the projecting portion.

An eighth technical means is the backlight device of the fifth technical means, wherein the heat radiation member has chassis contact portions that make contact with the back face chassis and radiation fins on sides of back faces of the chassis contact portions.

A ninth technical means is a liquid-crystal display device mounted with the backlight device of the first technical means.

Effect of the Invention

According to the present invention, since heat which is guided from a light source to a heat radiation member is partially transferred to a back face chassis at multiple sites via chassis contact portions of the heat radiation member, temperature variations are difficult to be caused in the back face chassis and it is possible to seek uniformity of temperature of the back face chassis.

Further, according to the present invention, the heat radiation member which holds the light source is provided on an opposite side to a light-guide plate across the back face chassis and it is possible to dissipate the heat from the light source efficiently. Then, the back face chassis is positioned immediately at a chassis holding portion of the heat radiation member and positional displacement is able to be prevented, thus facilitating manufacturing of a backlight device.

PREFERRED EMBODIMENT OF THE INVENTION

Description will hereinafter be given for preferred embodiments according to a backlight device and a liquid-crystal display device of the present invention with reference to the accompanying drawings.

Figure 1:
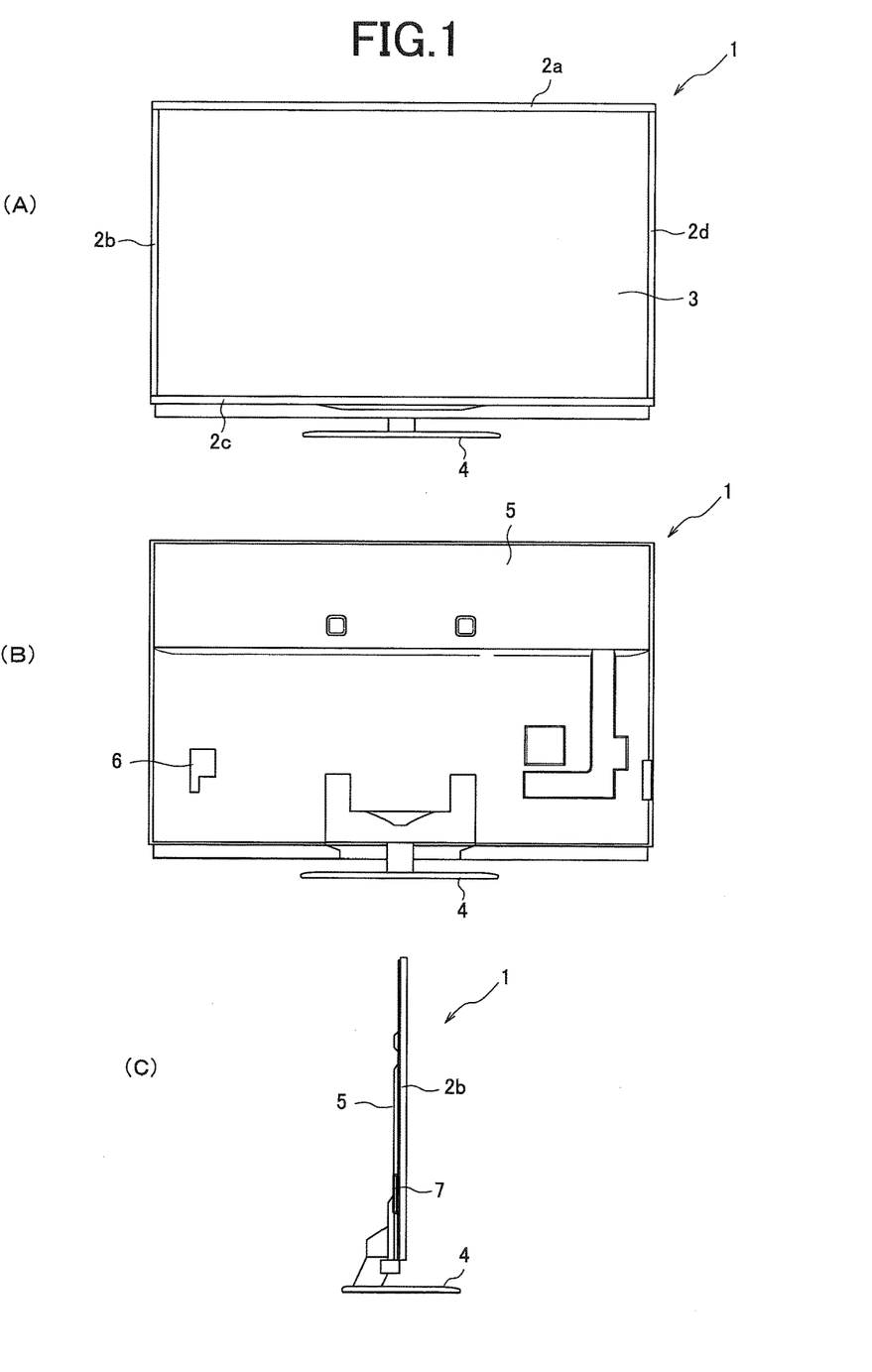
FIG. 1 is a view showing one example of an appearance of a liquid-crystal display device which includes a backlight device according to the present invention.

FIG. 1 is a view showing one example of an appearance of the liquid-crystal display device which includes the backlight device according to the present invention. FIG. 1(A) shows a state of the liquid-crystal display device in front view, FIG. 1(B) shows a state of the liquid-crystal display device in back view, and FIG. 1(C) shows a state of the liquid-crystal display device in left view. In the figures, 1 denotes the liquid-crystal display device, 2a to 2d denote front face frames, 3 denotes a liquid-crystal panel, 4 denotes a stand, 5 denotes a back face cabinet, 6 denotes a power cord pulling out portion, and 7 denotes an operation button portion.

Figure 3:
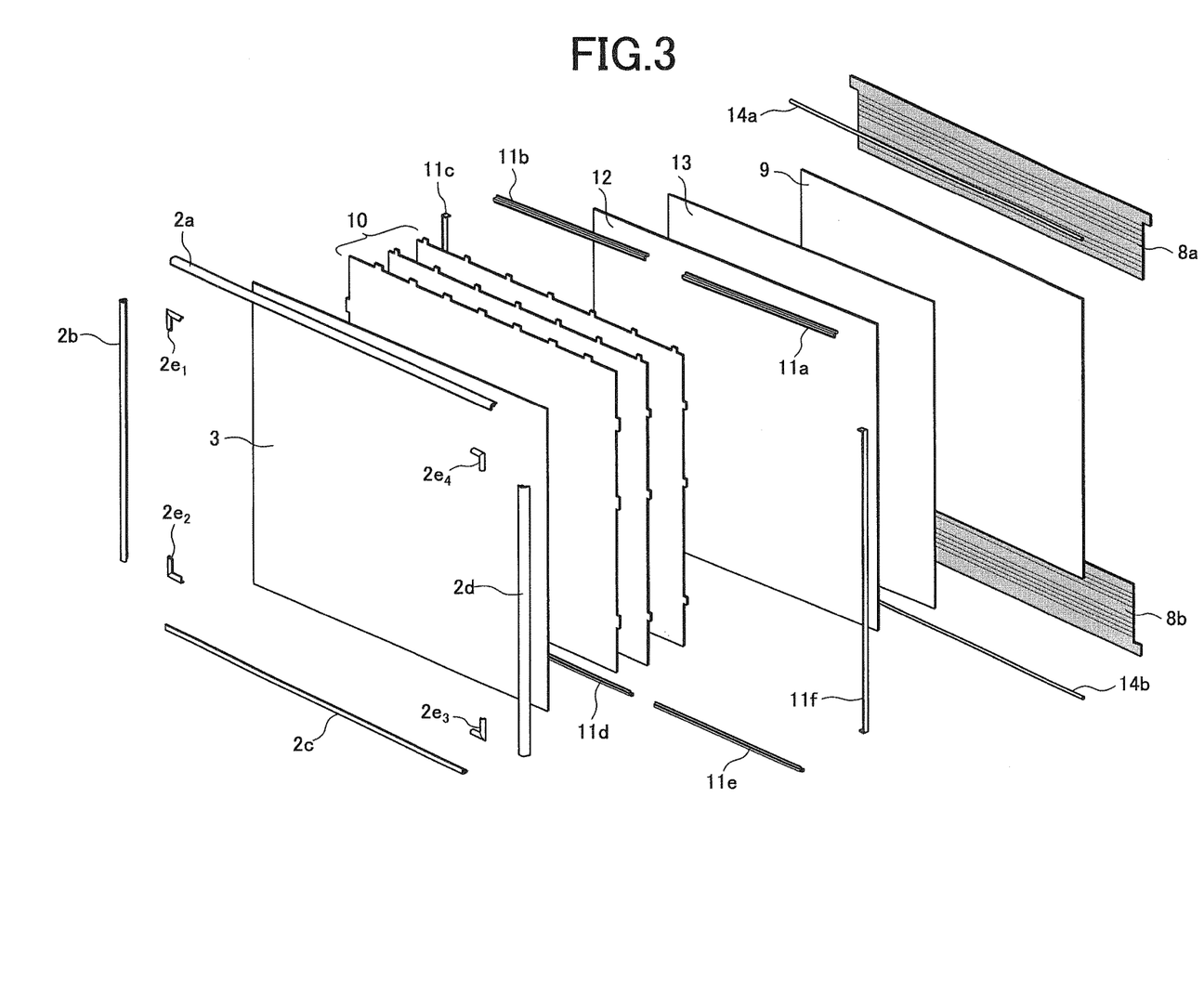
FIG. 3 is a view showing one example of a state of an exploded internal structure of the liquid-crystal display device shown in FIG. 1.

In FIG. 1, the liquid-crystal panel 3 has a structure in which a liquid crystal is sandwiched between two glass substrates, and has a function as a light shutter that controls transmittance/block of light emitted from a light-guide plate 12 shown in FIG. 3 and the like when state of liquid crystal molecular orientation forming the liquid crystal is controlled. Moreover, the front face frames 2a to 2d are provided around the liquid-crystal panel 3 and have a frame structure in which a front face cabinet is vertically and horizontally divided into four for saving costs of producing a mold of the front face cabinet. The front face frames 2a to 2d are made of not a plastic but metal, for example, such as aluminum alloy for enhancing designability.

The plastic back face cabinet 5 covers a back face side of a backlight device described below, and in a lower side thereof, the stand 4 that supports the liquid-crystal display device 1 is attached. The power cord pulling out portion 6 for pulling out a power cord from an inside of the liquid-crystal display device 1 is formed in the back face cabinet 5. Moreover, the operation button portion 7 for operating the liquid-crystal display device 1 is provided on a left-side face of the liquid-crystal display device 1.

Figure 2:
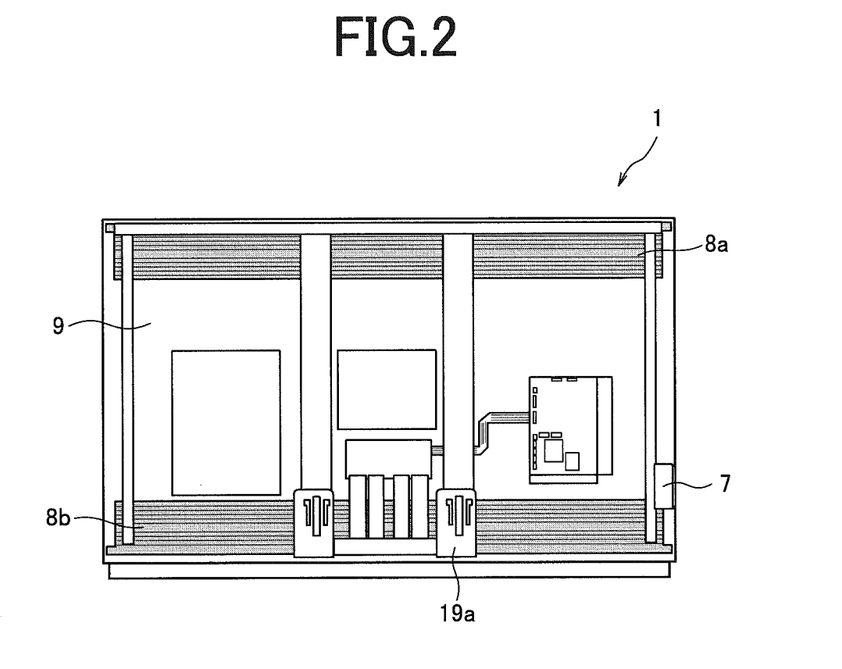
FIG. 2 is a view showing a state where a back face cabinet is detached from the liquid-crystal display device shown in FIG. 1.

FIG. 2 is a view showing a state where the back face cabinet is detached from the liquid-crystal display device shown in FIG. 1. In the state where the back face cabinet 5 is detached, heat spreaders 8a and 8b, a backlight chassis 9, and a center seal and auxiliary metal fitting framework 19a which is fixed on a back face side of these heat spreaders 8a and 8b and the backlight chassis 9, etc. are seen.

The heat spreaders 8a and 8b function as heat radiation members for radiating heat of an LED light source, and are made of, for example, aluminum alloy having high radiation performance. The heat spreaders 8a and 8b extend in a horizontal direction of the liquid-crystal display device 1 and are arranged in upper and lower ends of a back face of the backlight chassis 9. The backlight chassis 9 is made of metal, for example, such as iron, and are positioned by the heat spreaders 8a and 8b as described below. Note that, the backlight chassis 9 corresponds to a back face chassis of the present invention.

A lateral length of the heat spreaders 8a and 8b is set to be substantially equal to a length in a horizontal direction of the liquid-crystal panel 3. On the other hand, a vertical length of the heat spreaders 8a and 8b is set to be about 150 mm, for example, when a screen size is 70 inches and material of the heat spreaders 8a and 8b is aluminum. This length is able to be determined appropriately by calculating an area needed for radiation with respect to a heat generation amount of an LED according to the screen size. As described below, since the heat spreaders 8a and 8b are arranged on a back face side of the backlight chassis 9, it is possible to increase a radiation area. This makes it possible to obtain higher radiation effect.

FIG. 3 is a view showing one example of a state of an exploded internal structure of the liquid-crystal display device shown in FIG. 1. The front face frames 2a to 2d described in FIG. 1 are assembled as one frame member by frame fastening metal fittings $2e_1$ to $2e_4$ which are arranged at four corners, and fixed around the liquid-crystal panel 3.

On a back face side of the liquid-crystal panel 3, an optical sheet 10, the light-guide plate 12, a reflection sheet 13, and the backlight chassis 9 are provided in this order.

The optical sheet 10 is made of, for example, two micro lens sheets and one luminance improved sheet, and has functions of making light emitted from the light-guide plate 12 uniform, improving luminance in a front side direction, etc. The light-guide plate 12 is made of a transparent plastic such as acrylic, and emits light from the LED light source to the liquid-crystal panel 3 which is positioned in the front side. The reflection sheet 13 has functions of reflecting light which is not incident on the light-guide plate 12 among the light emitted from the LED light source to make it incident on the light-guide plate 12, etc.

The backlight chassis 9 is provided on a back face side of the reflection sheet 13 and holds the light-guide plate 12 and the reflection sheet 13, and functions as an attachment board therefor. The heat spreaders 8a and 8b are provided on the back face side of the backlight chassis 9.

The heat spreader 8a holds a bar-shaped LED substrate 14a having the LED light source arranged therein at a position opposing to an incidence surface which is formed on an upper end of the light-guide plate 12, and has a function of radiating heat from the LED substrate 14a. The heat spreader 8b holds a bar-shaped LED substrate 14b at a position opposing to an incidence surface which is formed on a lower end of the light-guide plate 12, and has a function of radiating heat from the LED substrate 14b.

The heat spreaders 8a and 8b are fixed to the LED substrates 14a and 14b with double-stick tape or the like. Note that, the light-guide plate 12, the reflection sheet 13, the LED substrates 14a and 14b, the backlight chassis 9, and the heat spreaders 8a and 8b correspond to the backlight device of the present invention.

Here, while the heat from the LED substrates 14a and 14b are dissipated by the heat spreaders 8a and 8b, the present invention focuses on arranging the heat spreaders 8a and 8b behind the backlight chassis 9, in order to make it difficult for the heat generated at the LED substrates 14a and 14b to be transferred to an inside of the backlight device, in other words, in order to make the heat generated at the LED substrates 14a and 14b escape outside the backlight device easily.

Note that, the liquid-crystal display device 1 includes intermediate chassis 11a to 11f made of plastic or the like. The intermediate chassis 11a to 11f are arranged between a peripheral portion of the optical sheet 10 and a peripheral portion of the light-guide plate 12. In this example, the intermediate chassis is shown to be divided into six, but may be divided into, for example, four, and the number of the division is not limited particularly.

Figure 4:
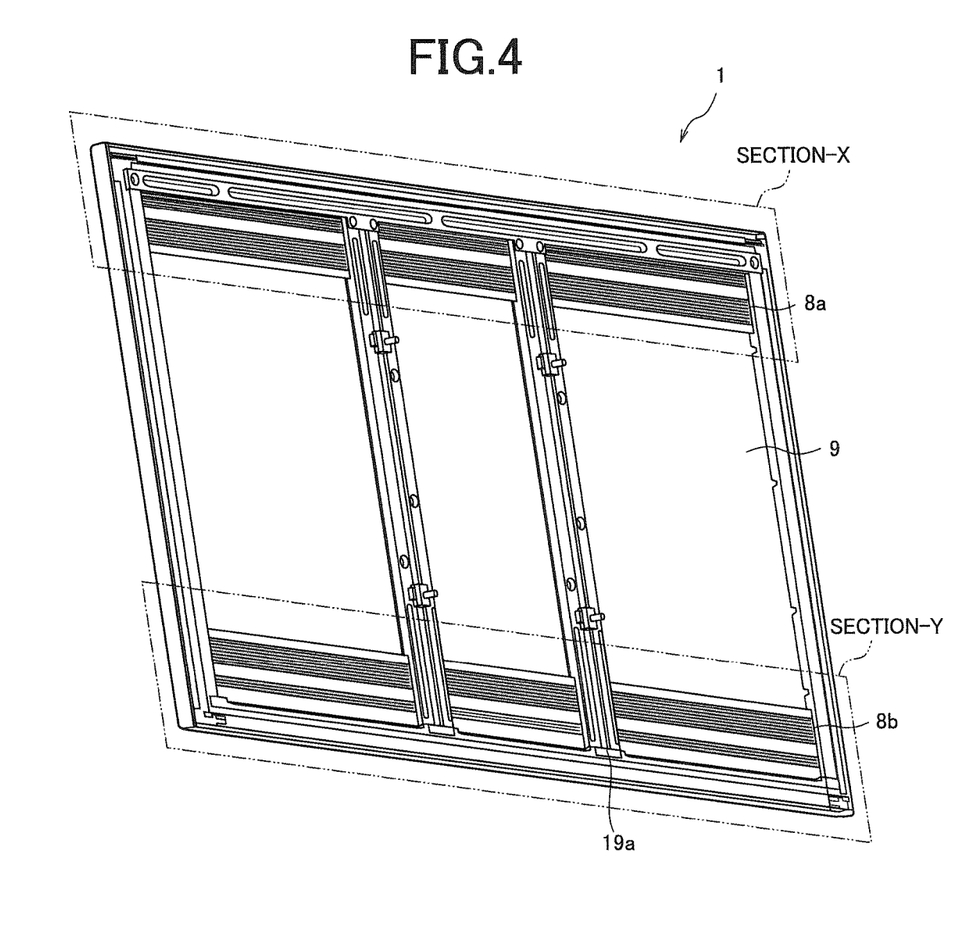
FIG. 4 is a view of a state where the back face cabinet is detached from the liquid-crystal display device shown in FIG. 1 when viewed from a diagonal back side.
Figure 5:
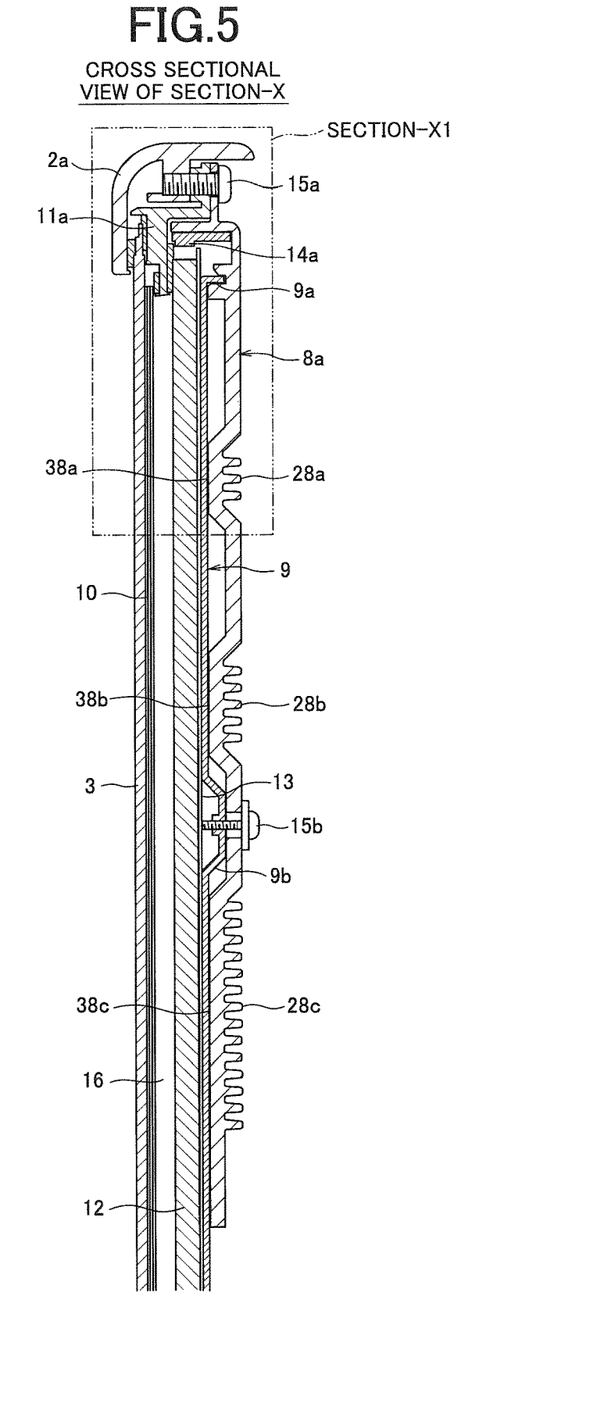
FIG. 5 is a view showing a cross section of an upper end portion of the liquid-crystal display device shown in FIG. 1.
Figure 6:
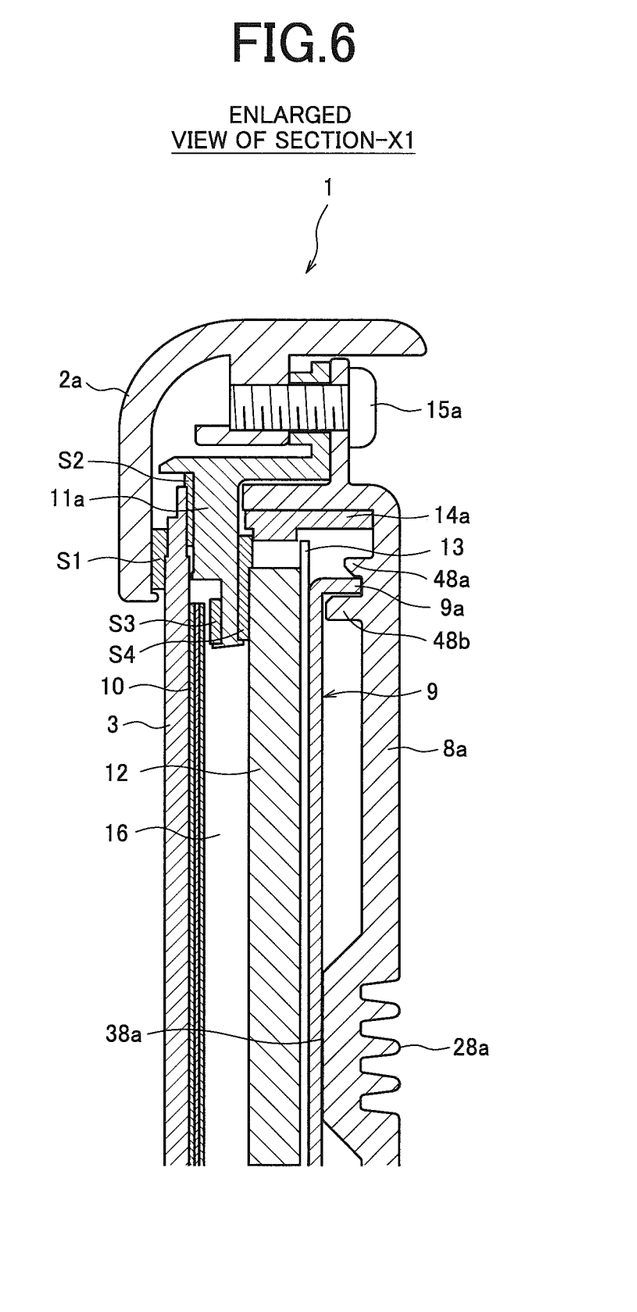
FIG. 6 is a view showing a cross section of the upper end portion of the liquid-crystal display device shown in FIG. 1.

FIG. 4 is a view of a state where the back face cabinet is detached from the liquid-crystal display device shown in FIG. 1 when viewed from a diagonal back side. FIG. 5 is a cross sectional view of a section-X (upper end portion of the liquid-crystal display device 1) of FIG. 4 in side view, and FIG. 6 is an enlarged view of a section-X1 of FIG. 5. Further, FIG. 7(A) is a cross sectional view of a section-Y (lower end portion of the liquid-crystal display device 1) of FIG. 4 in side view and FIG. 7(B) is an enlarged view of a section-Y1 of FIG. 7(A).

First, as shown in FIG. 5, the heat spreader 8a has one end side bent toward a side of the liquid-crystal panel 3, and the LED substrate 14a is provided on an inner surface of this bent portion.

Here, the heat spreader 8a and the backlight chassis 9 make partial contact with the back face of the back light chassis 9 at multiple sites so that the heat guided from the LED substrate 14a to the heat spreader 8a is transferred over a wide range of the backlight chassis 9, thus reducing the heat transferred from the heat spreader 8a to the backlight chassis 9.

Specifically, the other end side of the heat spreader 8a extends downward from a position where the LED substrate 14a is held at a position away from the back face of the backlight chassis 9 and radiation fins 28a to 28c capable of making contact with external air inside the back face cabinet 5 are formed on a back face of the heat spreader 8a. Among them, the radiation fin 28a is arranged at a position most proximate to the LED substrate 14a, and is made of, for example, three protrusions which extend in the horizontal direction of the liquid-crystal panel 3. The radiation fin 28b is arranged below the radiation fin 28a, and has a same shape as that of this radiation fin 28a, but is made of, for example, five protrusions. The radiation fin 28c is arranged below the radiation fin 28b, and has a same shape as those of the radiation fins 28a and 28b, but is made of, for example, fourteen protrusions.

Note that, for the back face of the heat spreader 8a having the radiation fins 28a to 28c, it is desired to apply, for example, black alumite treatment to a surface portion thereof. By generating a black film of aluminum oxide on the back face of the heat spreader 8a, emissivity is increased to make it possible to achieve a higher radiation effect.

Meanwhile, chassis contact portions 38a to 38c that extend along the LED substrate 14a and have contact areas which become larger as being away from the LED substrate 14a are formed on a front side of the heat spreader 8a. The chassis contact portion 38a is positioned on an opposite side to the radiation fin 28a, projected toward the liquid-crystal panel 3 side, and makes contact with the back face of the backlight chassis 9. The chassis contact portion 38b is positioned on an opposite side to the radiation fin 28b and projected toward the liquid-crystal panel 3 side. The chassis contact portion 38b makes contact with the back face of the backlight chassis 9 in the same manner as the chassis contact portion 38a, but makes contact with the back face of the backlight chassis 9 in a range larger than the contact area of the chassis contact portion 38a.

The chassis contact portion 38c is positioned on an opposite side to the radiation fin 28c, projected toward the liquid-crystal panel 3 side, and makes contact with the back face of the backlight chassis 9 in the same manner as the chassis contact portions 38a and 38b. However, the chassis contact portion 38c makes contact with the back face of the backlight chassis 9 in a range larger the contact areas of the chassis contact portions 38a and 38b.

In this manner, since the heat guided from the LED substrate 14a to the heat spreader 8a is transferred to the backlight chassis 9 at multiple sites via the chassis contact portions 38a to 38c, temperature variations are difficult to be caused in the backlight chassis 9 and it is possible to seek uniformity of temperature. Moreover, the optical sheet 10 becomes less affected.

Further, the radiation fins 28a to 28c are formed on back face sides of the chassis contact portions 38a to 38c, making it possible to reduce thickness of the backlight device. The chassis contact portions 38a to 38c increase contact areas with the backlight chassis 9 with the increasing distance from the LED substrate 14a becomes longer. Therefore, in the backlight chassis 9 which makes contact with the heat spreader 8a, a site having high temperature is not formed locally and a site having low temperature is formed over a wide range, so that high-low temperature variations are removed. Further, the optical sheet 10 becomes less affected.

Further, the front side of the heat spreader 8a having the chassis contact portions 38a to 38c is formed so that the backlight chassis 9 is able to be positioned. Specifically, as shown in FIG. 6, the heat spreader 8a has chassis holding portions 48a and 48b that are projected to the liquid-crystal panel 3 side in a vicinity of a position where the LED substrate 14a is held. The chassis holding portions 48a and 48b are provided, for example, at an interval which is slightly wider than thickness of the backlight chassis 9, and respectively extend in the horizontal direction of the liquid-crystal panel 3.

On the other hand, at an upper end of the backlight chassis 9, a bend portion 9a is formed so as to be projected in a direction away from the liquid-crystal panel 3 along the horizontal direction of the liquid-crystal panel 3. When the liquid-crystal display device 1 is assembled, as described below, a tip portion of this bend portion 9a is engaged with a protrusion formed on the front side of the heat spreader 8a, more specifically, the chassis holding portions 48a and 48b. Thereby, the backlight chassis 9 is supported by the heat spreader 8a and positioned.

Figure 7:
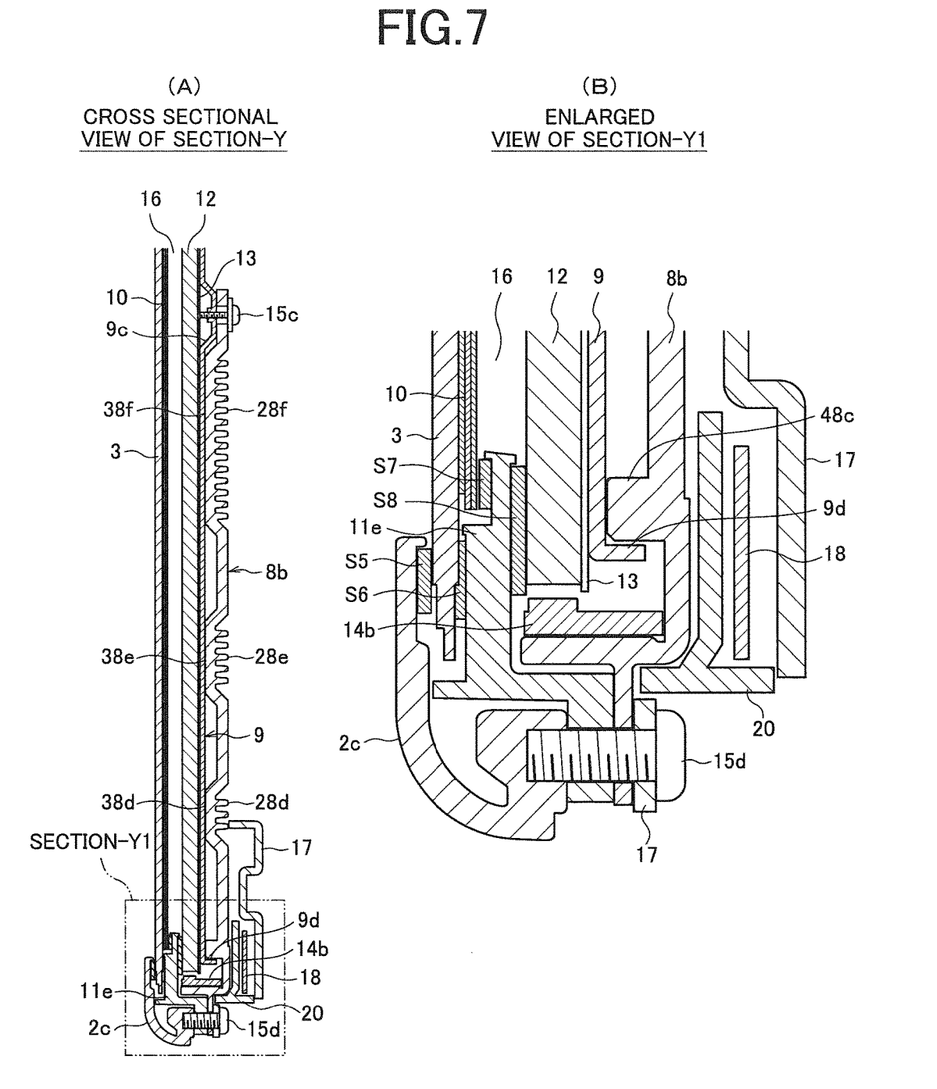
FIG. 7 is a view showing a cross section of a lower end portion of the liquid-crystal display device shown in FIG. 1.

Next, a lower section side of the liquid-crystal display device 1 also has the same configuration, and, as shown in FIG. 7(A), the heat spreader 8b and the backlight chassis 9 make partial contact with the back face of the back light chassis 9 at multiple sites so that the heat guided from the LED substrate 14b to the heat spreader 8b is transferred over a wide range of the backlight chassis 9, thus reducing the heat transferred from the heat spreader 8b to the backlight chassis 9. The heat spreader 8b has one end side bent toward the liquid-crystal panel 3 side and the LED substrate 14b is provided on an inner face of this bent portion. Note that, 17 denotes a substrate shield, 18 denotes a source substrate and 20 denotes a source substrate holder in FIG. 7.

The other end side of the heat spreader 8b extends upward from a position where the LED substrate 14b is held at a position away from the back face of the backlight chassis 9, and radiation fins 28d to 28f are formed on a back face of the heat spreader 8b. The radiation fin 28d is arranged at a position most proximate to the LED substrate 14b, and is made of, for example, three protrusions which extend in the horizontal direction of the liquid-crystal panel 3. The radiation fin 28e is arranged above the radiation fin 28d, and has a same shape as that of this radiation fin 28d, but is made of, for example, five protrusions. The radiation fin 28f is arranged above the radiation fin 28e, and has a same shape as those of the radiation fins 28d and 28e, but is made of, for example, fourteen protrusions. Note that, for the back face of the heat spreader 8b having the radiation fins 28d to 28f as well, it is desired to apply, for example, black alumite treatment to a surface portion thereof.

Meanwhile, chassis contact portions 38d to 38f that extend along the LED substrate 14b and have contact areas which become larger as being away from the LED substrate 14b are formed on a front side of the heat spreader 8b. The chassis contact portion 38d is positioned on an opposite side to the radiation fin 28d, projected toward the liquid-crystal panel 3 side, and makes contact with the back face of the backlight chassis 9. The chassis contact portion 38e is positioned on an opposite side to the radiation fin 28e and projected toward the liquid-crystal panel 3 side. The chassis contact portion 38e makes contact with the back face of the backlight chassis 9 in the same manner as the chassis contact portion 38d, but makes contact with the back face of the backlight chassis 9 in a range larger than the contact area of the chassis contact portion 38d.

The chassis contact portion 38f is positioned on an opposite side to the radiation fin 28f, projected toward the front side, and makes contact with the back face of the backlight chassis 9 in the same manner as the chassis contact portions 38d and 38e, but the chassis contact portion 38f makes contact with the back face of the backlight chassis 9 in a range larger the contact areas of the chassis contact portions 38d and 38e.

In this manner, since the heat guided from the LED substrate 14b to the heat spreader 8b is transferred to the backlight chassis 9 at multiple sites via the chassis contact portions 38d to 38f, temperature variations are difficult to be caused in the backlight chassis 9 and it is possible to seek uniformity of temperature. Moreover, the optical sheet 10 becomes less affected.

Further, the radiation fins 28d to 28f are formed on back face sides of the chassis contact portions 38d to 38f, making it possible to reduce thickness of the backlight device. The chassis contact portions 38d to 38f have larger contact areas with the backlight chassis 9 as a distance from the LED substrate 14b becomes longer. Therefore, in the backlight chassis 9 which makes contact with the heat spreader 8b, a site having high temperature is not formed locally and a site having low temperature is formed over a wide range, so that high-low temperature variations are removed. Further, the optical sheet 10 becomes less affected.

Further, the front side of the heat spreader 8b having the chassis contact portions 38d to 38f is formed so that the backlight chassis 9 is able to be positioned. As shown in FIG. 7(B), the heat spreader 8b has a chassis holding portion 48c that is projected to the liquid-crystal panel 3 side to extend in the horizontal direction in a vicinity of the position where the LED substrate 14b is held.

On the other hand, a bend portion 9d is formed at a lower end of the backlight chassis 9. The bend portion 9d is formed so as to be projected in a direction away from the liquid-crystal panel 3 along the horizontal direction of the liquid-crystal panel 3.

When the liquid-crystal display device 1 is assembled, a position of the bend portion 9a of the backlight chassis 9 shown in FIG. 6 and a position of the bend portion 9d shown in FIG. 7(B) are joined to a protrusion formed on the front side of the heat spreader 8a, more specifically, the chassis holding portions 48a and 48b and a protrusion formed on the front side of the heat spreader 8b, more specifically, the chassis holding portion 48c, respectively. When an inner side of the bend portion 9a is engaged with the chassis holding portion 48b as well as an inner side of the bend portion 9d is engaged with the chassis holding portion 48c, the backlight chassis 9 is supported by the chassis holding portions 48a to 48c and the chassis contact portions 38a to 38f of the heat spreaders 8a and 8b and a position of the backlight chassis 9 with respect to the heat spreaders 8a and 8b is determined.

In this manner, the heat spreaders 8a and 8b which hold the LED substrates 14a and 14b are provided on an opposite side to the light-guide plate 12 across the backlight chassis 9, and the heat from the LED substrates 14a and 14b is able to be dissipated efficiently with the atmosphere in the back face cabinet 5. Then, the backlight chassis 9 is positioned immediately by the chassis holding portions 48a, 48b, 48c and the like, and it is possible to prevent positional displacement, resulting that it becomes easier to manufacture the liquid-crystal display device 1 which includes the backlight device.

The backlight chassis 9 has a projection portion 9b which is projected in the direction away from the liquid-crystal panel 3 as shown in FIG. 5, and has a projection portion 9c as shown in FIG. 7(A).

As above, when the position of the backlight chassis 9 with respect to the heat spreader 8a is determined, the projection portion 9b makes contact with the front side of the heat spreader 8a at a fastening position of a fixing member, for example, a screw 15b which is positioned between the radiation fin 28b and the radiation fin 28c shown in FIG. 5. When the screw 15b is inserted from a back face side of the heat spreader 8a and the heat spreader 8a and the backlight chassis 9 are fastened, the backlight chassis 9 is fixed thorough the screw to the heat spreader 8a.

On the other hand, when the position of the backlight chassis 9 with respect to the heat spreader 8b is determined, the projection portion 9c makes contact with a front side of the heat spreader 8b at a fastening position of a screw 15c which is positioned above the radiation fin 28f shown in FIG. 7(A). When the screw 15c is inserted from the back face side of the heat spreader 8b and the heat spreader 8b and the backlight chassis 9 are fastened, the backlight chassis 9 is fixed with the screw to the heat spreader 8b.

In this manner, the backlight chassis 9 which is positioned by the chassis holding portions 48a to 48c is able to be fixed to the heat spreaders 8a and 8b reliably by using the screws 15b and 15c.

When the reflection sheet 13 and the light-guide plate 12 are attached in this order to the backlight chassis 9 which is fixed and the intermediate chassis 11a to 11f which are described in FIG. 3 are then inserted between the peripheral portion of the light-guide plate 12 and the peripheral portion of the optical sheet 10, an air layer 16 having thickness of about 3 mm is formed between the light-guide plate 12 and the optical sheet 10 (non-contact formation). Note that, the optical sheet 10 is fixed with multiple holes (not shown in the figures) formed along the peripheral portion thereof and ribs (not shown in the figures) formed in the intermediate chassis 11a to 11f fitted. In this manner, since the air layer 16 functions as a heat insulating layer which blocks the heat guided to the heat spreaders 8a and 8b, it becomes possible to make it difficult for this heat to be transferred to the optical sheet 10.

Subsequently, the liquid-crystal panel 3 is overlapped with the optical sheet 10 and a peripheral portion of the liquid-crystal panel 3 is pressed by the front face frames 2a to 2d. Note that, as shown in FIG. 6, spacer members S1, S2, S3 and S4 such as urethane are arranged between the front face frame 2a and the liquid-crystal panel 3, between the liquid-crystal panel 3 and a plastic frame 11a, between the optical sheet 10 and the plastic frame 11a, and between the plastic frame 11a and the light-guide plate 12, respectively. Further, as shown in FIG. 7(B), spacer members S5, S6, S7 and S8 such as urethane are arranged between the front face frame 2c and the liquid-crystal panel 3, between the liquid-crystal panel 3 and a plastic frame 11e, between the optical sheet 10 and the plastic frame 11e, and between the plastic frame 11e and the light-guide plate 12, respectively.

As shown in FIG. 5, one end side of the heat spreader 8a extends upward in a flange shape, and this flange-shaped portion and the front face frame 2a are able to sandwich an end portion of the intermediate chassis 11a therebetween.

The front face frame 2a, the intermediate chassis 11a and the heat spreader 8a are integrally fixed with the screw 15a, etc. from the back face side of the heat spreader 8a. In addition, as shown in FIG. 7(A), one end side of the heat spreader 8b also extends downward in a flange shape, and this flange-shaped portion and the front face frame 2c are able to sandwich an end portion of the intermediate chassis 11e therebetween. The front face frame 2c, the intermediate chassis 11e and the heat spreader 8b are also integrally fixed by using the screw 15d, etc. inserted from the back face side.

Note that, because of a cutting position, the substrate shield 17 of FIG. 7(B) appears to be separated, but the substrate shield 17 may be also fixed together by the screw 15d on this heat spreader 8b side. Moreover, as to the fixed site with the screws 15a and 15d, etc., for example, four corners of the liquid-crystal display device 1 are fixed. By performing fixing with the screw in a depth direction from the back face in this manner, it is possible to secure strength of a housing, and it is further possible to hide the screw when viewed form the front side of the liquid-crystal display device 1, so that it is desirable also from a viewpoint of designability.

In addition, as above, since the intermediate chassis is sandwiched between the heat spreaders 8a and 8b and the front face frames 2a and 2c, the heat from the LED substrates 14a and 14b becomes difficult to be transferred to the front face frames 2a and 2c. Furthermore, with the non-contact formation where the optical sheet 10 and the light-guide plate 12 are separated by the intermediate chassis, it is possible to make lengths in horizontal and vertical directions of the light-guide plate shorter than lengths in horizontal and vertical directions of the liquid-crystal panel, thus making it possible to narrow a frame portion of a screen.

As above, though embodiments have been described, a backlight device of the present invention may include a light-guide plate that emits incident light from an end face to a front side; a light source that irradiates light toward the end face; a back face chassis that is provided on a side of a back face of the light-guide plate; and a heat radiation member that is provided on a side of a back face of the back face chassis and dissipates heat from the light source, in which the heat radiation member may have chassis contact portions that make partial contact with the back face of the back face chassis at multiple sites. In this manner, since the heat guided from the light source to the heat radiation member is transferred at the multiple sites via the chassis contact portions of the heat radiation member to the back face chassis, temperature variations are difficult to be caused in the back face chassis and it is possible to seek uniformity of temperature of the back face chassis.

Moreover, the chassis contact portions may increase contact areas with the back face chassis with the increasing distance from the light source becomes longer. The chassis contact portions have larger contact areas with the back face chassis as the distance from the light source becomes longer. Therefore, in the back face chassis, a site having high temperature is not formed locally and a site having low temperature is formed over a wide range, so that high-low temperature variations are removed.

Moreover, the heat radiation member may have radiation fins on sides of back faces of the chassis contact portions. This makes it possible to reduce thickness of the backlight device as well as to remove high-low temperature variations more reliably in the back face chassis which makes contact with the heat radiation member.

Preferably, the heat radiation member may be made of aluminum and a surface thereof may be subjected to black alumite treatment. In this case, by generating a black film of aluminum oxide on the heat radiation member, emissivity is increased to make it possible to further enhance a radiation effect.

Moreover, a liquid-crystal display device may be mounted with the backlight device described above. Thereby, temperature in the liquid-crystal display device also becomes uniform.

Moreover, a backlight device of the present invention may include a light-guide plate that emits incident light from an end face to a front side; a light source that irradiates light toward the end face; a back face chassis that is provided on a side of a back face of the light-guide plate; and a heat radiation member that is provided on a side of a back face of the back face chassis, holds the light source at a site being extended to the end face, and dissipates heat from the light source, in which the heat radiation member may have a chassis holding portion that determines a position of the back face chassis. In this manner, the heat radiation member that holds the light source is provide on an opposite side to the light-guide plate across the back face chassis and it is possible to dissipate the heat from the light source efficiently. Then, the back face chassis is positioned immediately by the chassis holding portion of the heat radiation member, and it is possible to prevent positional displacement, resulting that it becomes easier to manufacture the backlight device.

Moreover, a bend portion that an end edge of the back face chassis is bent to the side of the back face of the back face chassis may be included and an inner side of the bend portion and the chassis holding portion may be engaged. Since the inner side of the bend portion of the back face chassis is engaged with a projection portion of the chassis holding portion, positional displacement of the back face chassis is able to be prevented reliably.

Moreover, the back face chassis may have a projecting portion on the back face of the back face chassis and may be fixed to the heat radiation member by using a fixing member inserted from a side of a back face of the heat radiation member at the projecting portion. The back face chassis which is positioned by the chassis holding portion is able to be fixed to the heat radiation member reliably by using the fixing member.

Moreover, the heat radiation member may have chassis contact portions that make contact with the back face chassis and radiation fins on sides of back faces of the chassis contact portions. This makes it possible to reduce thickness of the backlight device, as well as in the back face chassis which makes contact with the heat radiation member, a site having high temperature is not formed locally and a site having low temperature is formed over a wide range, so that high-low temperature variations are removed.

Moreover, a liquid-crystal display device may be mounted with the backlight device described above. Thereby, it becomes easier to manufacture the liquid-crystal display device as well.

EXPLANATIONS OF LETTERS OR NUMERALS

1 . . . liquid-crystal display device, 2a to 2d . . . front face frame, $2e_1$ to $2e_4$ . . . frame fastening metal fitting, 3 . . . liquid-crystal panel, 4 . . . stand, 5 . . . back face cabinet, 6 . . . power cord pulling out portion, 7 . . . operation button portion, 8a, 8b . . . heat spreader, 9 . . . backlight chassis, 9a, 9d . . . bend portion, 9b, 9c . . . projecting portion, 10 . . . optical sheet, 11a to 11f . . . intermediate chassis, 12 . . . light-guide plate, 13 . . . reflection sheet, 14a, 14b . . . LED substrate, 15a to 15d . . . screw, 16 . . . air layer, 17 . . . substrate shield, 18 . . . source substrate, 19a . . . center seal and auxiliary metal fitting framework, 20 . . . source substrate holder, 28a to 28f . . . radiation fin, 38a to 38f . . . chassis contact portion, and 48a to 48c . . . chassis holding portion.

The invention claimed is:

1. A backlight device, comprising:
a light-guide plate that conducts incident light from an end face to a front side;
a light source that irradiates light toward the end face;
a back face chassis that is provided on a side of a back face of the light-guide plate; and
a heat radiation member formed by a monolithic material and provided on a side of a back face of the back face chassis and dissipates heat from the light source,
the heat radiation member having chassis contact portions formed by a plurality of rectangular surfaces that protrudes toward the back face chassis such that the chassis contact portions make partial contact with the back face of the back face chassis at multiple sites, wherein
the chassis contact portions further from the light source have larger contact areas with the back face chassis than the chassis contact portions closer to the light source.

2. The backlight device according to claim 1, wherein the heat radiation member has radiation fins on sides of back faces of the chassis contact portions.

3. The backlight device according to claim 1, wherein the heat radiation member is made of aluminum and a surface thereof is subjected to black alumite treatment.

4. A liquid-crystal display device mounted with the backlight device according to claim 1.

5. A backlight device, comprising:
a light-guide plate that conducts incident light from an end face to a front side;
a light source that irradiates light toward the end face;
a back face chassis that is provided on a side of a back face of the light-guide plate; and
a heat radiation member that is provided on a side of a back face of the back face chassis, holds the light source at a site extended toward the end face, and dissipates heat from the light source,
the heat radiation member having a chassis holding portion that determines a position of the back face chassis, wherein
a bend portion that an end edge of the back face chassis is bent to the side of the back face of the back face chassis is included and an inner side of the bend portion and the chassis holding portion are engaged to prevent movement of the back face chassis in a vertical direction of the back face chassis.

6. The backlight device according to claim 5, wherein the back face chassis has a projecting portion on the back face of the back face chassis and is fixed to the heat radiation member by using a fixing member inserted from a side of a back face of the heat radiation member at the projecting portion.

7. The backlight device according to claim 5, wherein the heat radiation member has chassis contact portions that make contact with the back face chassis and radiation fins on sides of back faces of the chassis contact portions.

* * * * *